United States Patent [19]
Zinsser et al.

[11] 3,818,173
[45] June 18, 1974

[54] JOINING LENGTHS OF WIRE END TO END FOR MANUFACTURE OF BIMETALLIC WIRE

[75] Inventors: Harry F. Zinsser, Bethel Park; Richard E. Locke, White Oak, both of Pa.

[73] Assignee: Copperweld Steel Company, Pittsburgh, Pa.

[22] Filed: Feb. 28, 1973

[21] Appl. No.: 336,784

Related U.S. Application Data

[63] Continuation-in-part of Ser. No. 161,888, July 12, 1971, abandoned.

[52] U.S. Cl. .................... 219/107, 29/487, 148/127
[51] Int. Cl. ............................................. B23k 9/02
[58] Field of Search ............... 219/104, 107, 56–58; 29/487; 148/127

[56] References Cited
UNITED STATES PATENTS

| | | | |
|---|---|---|---|
| 1,252,144 | 1/1918 | Murray et al. | 219/104 X |
| 1,445,411 | 2/1923 | Pfanstiehl | 219/107 |
| 2,627,009 | 1/1953 | Corson et al. | 219/104 |
| 3,073,729 | 1/1963 | Baer | 148/127 X |
| 3,134,701 | 5/1964 | Evans et al. | 148/127 X |
| 3,259,969 | 7/1966 | Tessmann | 219/104 X |
| 3,261,724 | 7/1966 | Ulam | 148/127 X |
| 3,499,804 | 3/1970 | Clarke | 148/127 |
| 3,613,107 | 10/1971 | Cavagnero | 219/104 X |

*Primary Examiner*—J. V. Truhe
*Assistant Examiner*—N. D. Herkamp
*Attorney, Agent, or Firm*—Buell, Blenko & Ziesenheim

[57] ABSTRACT

This application discloses joinder of wire lengths end to end with special usefulness in the manufacture of bimetallic wire. The disclosure includes steps of cleaning and aligning wire ends, aligning the ends and applying axial pressure, applying a welding current, removing flash and heat treating the joint.

9 Claims, 1 Drawing Figure

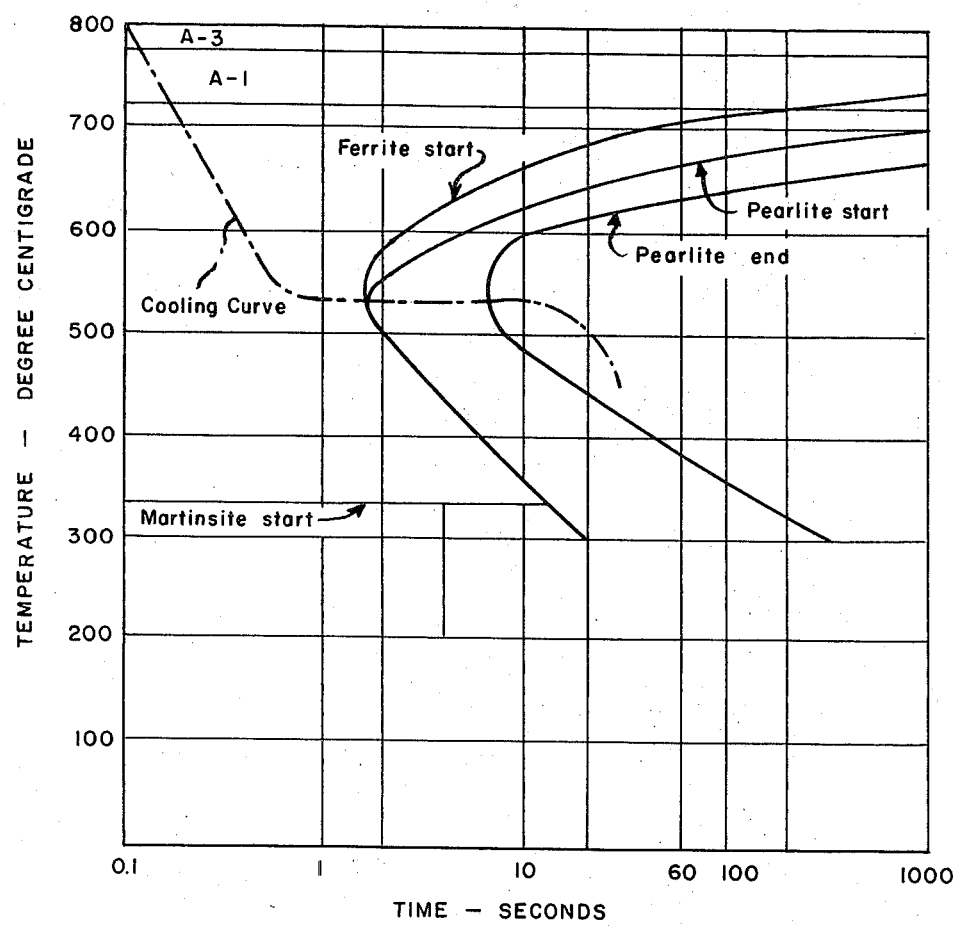

JOINING LENGTHS OF WIRE END TO END FOR MANUFACTURE OF BIMETALLIC WIRE

This application is a continuation-in-part of our copending U.S. Pat. application Ser. No. 161,888, filed July 12, 1971 now abandoned.

This invention relates to joining of lengths of wire end to end to form longer lengths. It is particularly useful in the manufacture of bimetallic wire on a continuous basis.

The manufacture of wire in various forms is notoriously old. One of the common problems which is inherent in manufacture and use of wire is obtaining the correct lengths without joints or breaks. Wire is commonly supplied in discrete lengths and it is often necessary to cut off and discard short or random lengths because they are excess on one job but are of insufficient length for another job.

Bimetallic wire is made commercially in accordance with the disclosure of NOETHLICH et al. U.S. Pat. No. 3,088,195 issued May 7, 1963. The process is a continuous one, and continuity is essential to avoid waste and irregular results which would arise from periodic interruptions in the process. Wire is received, however, from the mill at the cladding line in coils. Accordingly, it has been the practice to weld the ends together to ensure a continuous passage of wire through the cladding line. The joints have been markedly lower in strength than the wire. For that reason it has been necessary to cut the joints from the wire following passage through the cladding line but before drawing or shipment. The bimetallic wire is thereby produced in separate lengths no larger than the wire lengths available at the entrance end of the cladding line.

We true the ends of the lengths of wire to be joined forming a flat perpendicular face at the end. We align the ends of the two lengths and apply pressure axially to bring the two ends together and to upset the metal at the ends. We further heat the ends to a welding temperature while pressure is maintained and continue to maintain the pressure until the welded metal has solidified. We further prefer to heat the metal to a subcritical temperature to anneal it. We then prefer to heat the joint to a temperature in the order of 1,950° F. and maintain it at that temperature for several minutes. Thereafter we prefer to hold the joint rigid until it has cooled appreciably while controlling the cooling as desired. Finally, we prefer to clad the wire so formed with a dissimilar metal as for example following the process disclosed in Noethlich et al. U.S. Pat. No. 3,088,195.

In another embodiment of our invention we proceed as described above but after heating the joint to a temperature on the order of 1,950° F., we direct a blast of air or other cooling fluid on it so as to cool it rapidly to a subcritical temperature to be described in more detail hereinafter, and then hold it at that temperature for a time also to be described. This embodiment of our process is especially beneficial for steel wire having a carbon content above about 0.40 percent and confers on the wire properties not inferior to those of conventional lead patented wire.

Other details, objects and advantages of the invention will become more apparent as the following description of a present preferred embodiment thereof proceeds.

Initially two ends of lengths to be joined are straightened utilizing a hydraulic straightener. Any misalignment at the end of the lengths is trimmed and removed with an abrasive cut-off wheel which provide a straight section with a flat end on each length. That permits substantially perfect wire alignment when the ends are subsequently placed in welding dies. After trimming, each end is buffed on the surface from 4 to 6 inches from the face to remove surface oxides. Oxide removal provides a surface having good electrical conductivity and provides better and more uniform control of the welding current and, thereby, of uniformity in the welded joints. In that manner decarburization and physical strength at the weld are more-evenly controlled.

Following trimming and buffing of the ends they are clamped into welding dies comprising upper and lower sections. The lower sections are formed of beryllium copper. The upper sections are of steel with serrated tool steel inserts adapted to grip the wire ends firmly. When the wire ends are firmly clamped, the ends to be joined are axially aligned and the dies are moved toward each other a sufficient distance to bring the dressed wire ends into abutting contact. A welding current is supplied through the welding dies from a welding transformer passing through the wire ends and raising the temperature of the metal suffiently to allow welding and upset from the axial loading. After completion of heating, which may be pursuant to an automatic timer, the pressure is continued until the entire weld area has solidified, thereby ensuring that no stress is applied to the weld area while it remains partially molten.

Following welding, current is again supplied from the welding transformer to soften the area of the weld. Weld flash is then removed by a milling cutter having a cutting wheel which removes flash extending outside the normal diameter of the wire.

After flash removal the joined wires are transferred to separate jaws for purposes of heat treating the joint. A heating current is applied to the jaws sufficient to raise the temperature to about 1,950° F. The temperature is then held constant within about ± 10° F. for a period of about 2 minutes to homogenize the metal at and adjacent to the weld interface. The joint is then control cooled without being distrubed until the temperature is sufficiently low that imposition of stress will not distrub the weld interface or the adjoining microstructure.

It will be appreciated that the foregoing steps can readily be made subject to automatic control in whole or in part. The wire treated as above is preferably lead patented steel wire. Preferably the wire is then clad with a dissimilar metal. Thereafter it may be successfully reduced by cold drawing and preformed for cable stranding.

Tests have shown that joints formed as above consistently have a tensile strength in the range of 85 to 87 percent of the tensile strength of the wire. After drawing the joints have tensile strengths of approximately 90 percent of the wire strength. Accordingly, it becomes unnecessary to cut out the joints after cladding, and the clad wire may, instead, be considered and treated as one of infinite length issuing from the cladding line.

Wire joints treated as above described can be reduced considerably in diameter by cold drawing without requiring intermediate annealing. For maximum drawability, however, of steel wire having a carbon content of about 0.40 percent or more, we employ a modified process in which the homogenizing heat treatment above mentioned is followed by rapid cooling and an isothermal heat treatment at a subcritical temperature. We rapidly cool or quench the wire joint by directing on it a blast of air or other quenching fluid until its temperature drops to a predetermined subcritical value. The temperature is measured by a pyrometer which is preferably an optical pyrometer trained on the wire. When the predetermined temperature is reached, the air blast is shut off and the joint then continues to cool by giving off heat to the surrounding atmosphere, principally by radiation. The joint is held between the jaws previously mentioned surrounded by the ambient atmosphere, and cools largely by radiation of heat from the joint, and to some degree from the jaws, to surrounding air. A certain amount of heat is, of course, lost by conduction through the jaws to the remainder of the apparatus and through the wire itself to the coils being joined. The pyrometer measures this cooling, and it is counteracted by again applying heating current to the jaws holding the wire in amount just sufficient to maintain the temperature of the wire constant at the predetermined value for a predetermined time. After that time has elapsed the heating current is cut off, the jaws are opened, and the heat-treated wire joint is removed therefrom.

The temperature of heat treatment and time of holding are selected from curves plotted for the steel of the composition in question which show how the transformation of the steel proceeds with changes in temperature and time. Such a set of curves for 0.45 percent carbon steel is shown in the attached FIGURE, to which reference is now made. The abscissa of the curve is time in seconds, and the ordinate is temperature in degrees Centigrade. The horizontal line marked A-1 is drawn at the lower transformation temperature of the steel. At temperatures above that line, the steel is austenitic, while at temperatures below the line the steel begins to transform into ferrite and/or pearlite. This transformation requires time for its accomplishment. The curve marked "Ferrite start" is the locus of coordinate points at which the austenite of the steel starts to transform to ferrite. The curve marked "Pearlite start" is the locus of points at which the austenite or ferrite starts to transform to pearlite, while the curve marked "Pearlite end" is the locus of points at which the pearlite transformation is completed and the steel is substantially all pearlitic. The horizontal line marked "Martensite start" is drawn at the temperature at which austenite begins to transform to martensite, and is included for the sake of completeness. The steel is not transformed to martensite in our process.

It will be observed that the Ferrite start and Pearlite end transformation curves above mentioned are roughly parabolic in shape, each having a nose at about 550° C. (1,022° F.). The time required to complete the transformation from austenite to pearlite at a constant temperature is measured by the difference of the abscissae of the intercepts of the Ferrite start and Pearlite end curves by the ordinate of the temperature. It will also be observed that the upper branch of the Ferrite start curve becomes tangent to the upper branch of the Pearlite start curve at the nose of the latter, which occurs at about 530° C. (986° F.). This means that below that temperature austenite transforms directly to pearlite without passing through the ferrite phase.

We find that a fully pearlitic structure of the steel in our joints after welding is most desirable from the standpoint of drawability. We also find that the finer pearlite which results from transformation at higher temperatures is more desirable than the coarser pearlite which results from transformation at lower temperatures, but that the presence of ferrite is undesirable. These conditions lead us to prefer a temperature at or slightly below that of the nose of the Pearlite start curve for our isothermal heat treating step. As the lower branches of the Pearlite start and Pearlite end curves diverge somewhat as the temperature decreases, the time required for complete transformation to pearlite is a minimum at the transformation temperature above mentioned. We carry out our isothermal heat treatment step well above the Martensite start temperature of about 330° C. (636° F.).

We therefore adjust our operation so that the wire joint in the jaws of our apparatus is heat treated in the sequence indicated graphically by the Cooling curve plotted in the FIGURE. The joint is cooled rapidly by air blast from a temperature above the A-1 temperature of the steel to the temperature of the nose of the Pearlite start curve — about 530° C. This cooling takes place in about 1 second. The joint is then held at that temperature for a time sufficient to allow the transformation from austenite to pearlite to reach completion — about 10 seconds. Our pyrometer measures the temperature of the joint during this time and if that temperature falls below about 530° C. current is passed through the joint, thus heating it, until its temperature again reaches 530° C. The joint is then allowed to cool in air to room temperature. This cooling may be accelerated by an air blast or the like, as long as the cooling curve remains to the right of the Pearlite start curve of the FIGURE.

Wire joints made from steels of other carbon contents, with or without other alloying constituents, are heat treated in the manner above described but at temperatures and for times derived from curves similar to those of the FIGURE but plotted for their particular compositions. Those skilled in the art are familiar with such curves.

While the curves correspond to the beginning and the completion of the transformation of the constituents indicated, it will be understood that the boundaries are not sharply marked. Heat treatment of the wire joint at or below the temperature at which the Ferrite start and Pearlite start curves become tangent does not result in a wholly pearlitic structure entirely free from ferrite, but it does produce a pearlite structure containing a minimum amount of ferrite.

In the foregoing specification we have described a presently preferred embodiment of this invention, however, it will be understood that this invention can be otherwise embodied within the scope of the following claims.

We claim:

1. The method of welding lengths of steel wire end to end which comprises:

1. axially aligning the lengths to be joined and bringing their ends into abutting relationship;
  2. applying a welding current to heat the two ends to welding temperature while simultaneously applying pressure to the pieces;

3. heating the joint to a subcritical temperature to anneal it;
4. heating the joint to a temperature above the critical temperature of the metal and holding it at that temperature to homogenize the weld zone and control the micro-structure in the weld zone by controlling the cooling rate of the joint from the homogenizing temperature.

2. The method of claim 1 in which the joint is heated to a homogenizing temperature of about 1,950° F.

3. The method of claim 1 in which the joint is heated to a homogenizing temperature of 1,950° F. ± 10° F.

4. The method of claim 1 in which lead-patented steel wire is joined.

5. The method of claim 1 including:
5. directing a blast of a cooling fluid on the joint so as to cool the steel rapidly to a subcritical temperature at which the carbon in the steel transforms directly to pearlite in minimum time.

6. The method of claim 5 including:
6. supplying heat to the joint so as to hold its temperature constant at the said subcritical temperature until the transformation of the carbon to pearlite is complete.

7. The method of claim 6 in which step (6) is carried out while the joint is surrounded by the ambient atmosphere and tends to lose temperature by radiating heat thereto, and heat is supplied to the joint in amounts just sufficient to compensate for that temperature loss.

8. The method of claim 6 in which step (6) is accomplished by passing electric current through the joint.

9. The method of claim 7 including:
7. measuring the temperature of the joint with a pyrometer and in which its temperature is held constant by adjusting the current passing through the joint to maintain constant the pyrometer reading.

* * * * *